United States Patent
Iimura et al.

(10) Patent No.: US 12,428,045 B2
(45) Date of Patent: Sep. 30, 2025

(54) CART

(71) Applicant: HONDA MOTOR CO., LTD., Tokyo (JP)

(72) Inventors: Taiki Iimura, Saitama (JP); Kazushi Akimoto, Saitama (JP); Kazumasa Ozaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 695 days.

(21) Appl. No.: 17/874,575

(22) Filed: Jul. 27, 2022

(65) Prior Publication Data
US 2023/0035700 A1 Feb. 2, 2023

(30) Foreign Application Priority Data
Jul. 29, 2021 (JP) ................................. 2021-124301

(51) Int. Cl.
*B62B 5/00* (2006.01)
*B62B 5/06* (2006.01)

(52) U.S. Cl.
CPC .......... *B62B 5/0073* (2013.01); *B62B 5/0033* (2013.01); *B62B 5/06* (2013.01)

(58) Field of Classification Search
CPC ........ B62B 5/0073; B62B 5/0033; B62B 5/06
See application file for complete search history.

(56) References Cited

U.S. PATENT DOCUMENTS

| 5,746,282 A | * | 5/1998 | Fujiwara | B60L 15/2009 180/6.5 |
| 2016/0137216 A1 | * | 5/2016 | Nilsson | B62B 3/001 701/1 |
| 2017/0001656 A1 | | 1/2017 | Katayama et al. | |

FOREIGN PATENT DOCUMENTS

JP 2004114800 A 4/2004

OTHER PUBLICATIONS

Examination Report for Indian Patent Application No. 202244042968 dated Feb. 16, 2023; 6 pp.

* cited by examiner

*Primary Examiner* — Hitesh Patel
*Assistant Examiner* — Joshua Jeffrey Penko
(74) *Attorney, Agent, or Firm* — ARMSTRONG TEASDALE LLP (57) ABSTRACT

A cart includes a control unit configured to multiply a provisional target front and rear velocity by a correction coefficient thereby setting a target front and rear velocity and multiply a provisional target lateral velocity by the correction coefficient thereby setting a target lateral velocity if the provisional target front and rear velocity is equal to or higher than a front and rear velocity upper limit or if the provisional target lateral velocity is equal to or higher than a lateral velocity upper limit, set the provisional target front and rear velocity to the target front and rear velocity and set the provisional target lateral velocity to the target lateral velocity if the provisional target front and rear velocity is lower than the front and rear velocity upper limit and the provisional target lateral velocity is lower than the lateral velocity upper limit.

10 Claims, 7 Drawing Sheets

CART

TECHNICAL FIELD

The present invention relates to a cart.

BACKGROUND ART

JP2004-114800A discloses a power assist cart including a handle that detects an operation force of a user, and a power assist control means that drives driving wheels for driving and steering the cart based on the operation force input to the handle. The cart detects a turning state, and decelerates or stops at the time of turning, thereby suppressing an unintended acceleration due to an erroneous operation at the time of turning.

The cart according to JP2004-114800A detects the turning state, and executes deceleration control when the cart is in the turning state. Accordingly, even if an excessive operation is input when the cart goes straight or translates, the velocity (speed) is not limited.

SUMMARY OF THE INVENTION

In view of the above background, an object of the present invention is to provide a cart that can limit the velocity in response to an excessive operation.

To achieve such an object, one aspect of the present invention provides a cart (1) comprising: a vehicle body (2); at least one omnidirectional wheel (3) provided at the vehicle body and configured to move the vehicle body in all directions along a floor; a drive unit (4) configured to drive each omnidirectional wheel; a handle (5) provided at the vehicle body and configured to accept an operation by a user; a load sensor (6) configured to detect a front and rear load and a lateral load applied to the handle; and a control unit (7) configured to control the drive unit based on the front and rear load and the lateral load detected by the load sensor, wherein the control unit is configured to set a provisional target front and rear velocity of the vehicle body based on the front and rear load, and set a provisional target lateral velocity of the vehicle body based on the lateral load, multiply the provisional target front and rear velocity by a correction coefficient thereby setting a target front and rear velocity, and multiply the provisional target lateral velocity by the correction coefficient thereby setting a target lateral velocity in a case where the provisional target front and rear velocity is equal to or higher than a front and rear velocity upper limit or in a case where the provisional target lateral velocity is equal to or higher than a lateral velocity upper limit, the correction coefficient being set to be greater than zero and equal to or smaller than one, set the provisional target front and rear velocity to the target front and rear velocity, and set the provisional target lateral velocity to the target lateral velocity in a case where the provisional target front and rear velocity is lower than the front and rear velocity upper limit and the provisional target lateral velocity is lower than the lateral velocity upper limit, and control the drive unit based on the target front and rear velocity and the target lateral velocity.

According to this aspect, in a case where the provisional target front and rear velocity is equal to or higher than the front and rear velocity upper limit or in a case where the provisional target lateral velocity is equal to or higher than the lateral velocity upper limit, the correction coefficient is set and thus the target front and rear velocity and the target lateral velocity are limited. Accordingly, it is possible to provide a cart that can limit the velocity in response to an excessive operation.

In the above aspect, preferably, the smaller of a first value and a second value is set to the correction coefficient, the first value being calculated by dividing the front and rear velocity upper limit by the provisional target front and rear velocity, the second value being calculated by dividing the lateral velocity upper limit by the provisional target lateral velocity.

According to this aspect, the target front and rear velocity is set to be equal to or lower than the front and rear velocity upper limit, and the target lateral velocity is set to be equal to or lower than the lateral velocity upper limit. Further, the ratio of the target front and rear velocity to the target lateral velocity becomes identical to the ratio of the provisional target front and rear velocity to the provisional target lateral velocity, so that the travel direction of the cart is maintained.

In the above aspect, preferably, the at least one omnidirectional wheel comprises a pair of omnidirectional wheels arranged at an interval in a lateral direction, the load sensor is configured to detect a moment around a vertical axis in addition to the front and rear load and the lateral load, and the control unit is configured to set a target angular velocity of the vehicle body based on the moment, and control the drive unit based on the target front and rear velocity, the target lateral velocity, and the target angular velocity.

According to this aspect, the target angular velocity is not limited regardless of the operation force of the user. Accordingly, it is possible to turn the cart according to the intention of the user.

In the above aspect, preferably, the control unit sets the target angular velocity independently of the correction coefficient.

According to this aspect, the target angular velocity is not limited regardless of the operation force of the user. Accordingly, it is possible to turn the cart according to the intention of the user.

In the above aspect, preferably, the drive unit includes a plurality of electric motors (25), and the control unit is configured to set a first rotational speed of each electric motor based on the target front and rear velocity, set a second rotational speed of each electric motor based on the target lateral velocity, set a third rotational speed of each electric motor based on the target angular velocity, and set a provisional target rotational speed of each electric motor based on the first rotational speed, the second rotational speed, and the third rotational speed, set a target rotational speed of each electric motor based on a product of a motor rotational speed correction coefficient and the first rotational speed, a product of the motor rotational speed correction coefficient and the second rotational speed, and the third rotational speed in a case where the provisional target rotational speed of at least one of the electric motors is higher than a maximum rotational speed, the motor rotational speed correction coefficient being set to be greater than zero and equal to or smaller than one, and set the provisional target rotational speed to the target rotational speed in a case where the provisional target rotational speed of all the electric motors is equal to or lower than the maximum rotational speed.

According to this aspect, even if the target rotational speed of each electric motor drops to the maximum rotational speed or less, the third rotational speed to achieve the target angular velocity is not limited. Accordingly, it is possible to turn the cart according to the intention of the user.

In the above aspect, preferably, the motor rotational speed correction coefficient is set based on a following equation (1) in which "kr" represents the motor rotational speed correction coefficient, "rm" represents the maximum rotational speed, "r1" represents the first rotational speed, "r2" represents the second rotational speed, and "r3" represents the third rotational speed.

$$kr=(rm-|r3|)/(|r1|+|r2|) \qquad \text{[equation 1]}$$

According to this aspect, when the provisional target rotational speed is higher than the maximum rotational speed, the target rotational speed is set to the maximum rotational speed.

In the above aspect, preferably, a reference point of the target angular velocity is arranged at a midpoint of a line segment connecting the pair of omnidirectional wheels.

According to this aspect, it is possible to turn the cart efficiently.

In the above aspect, preferably, each omnidirectional wheel includes: a pair of drive disks (18) rotatably supported by the vehicle body and arranged coaxially so as to face each other; a plurality of drive rollers (18B) arranged on an outer circumferential portion of each drive disk at intervals in a circumferential direction, each drive roller being supported so as to rotate around an axis inclining to the circumferential direction of the drive disk; and a main wheel (19) formed in an annular shape, arranged between the pair of drive disks, being in contact with the drive rollers, and configured to rotate around a central axis and an annular axis, the plurality of electric motors comprises four electric motors (25) corresponding to the respective drive disks and configured to rotate the corresponding drive disks, and the control unit is configured to set the target rotational speed of each electric motor based on the target front and rear velocity, the target lateral velocity, and the target angular velocity.

According to this aspect, the cart can go straight, translate, and turn.

Another aspect of the present invention provides a cart (1) comprising: a vehicle body (2); at least one omnidirectional wheel (3) provided at the vehicle body and configured to move the vehicle body in all directions along a floor; a drive unit (4) configured to drive each omnidirectional wheel; a handle (5) provided at the vehicle body and configured to accept an operation by a user; a load sensor (6) configured to detect a load applied to the handle; and a control unit (7) configured to control the drive unit based on the load detected by the load sensor, wherein the control unit is configured to set a provisional target velocity vector of the vehicle body based on the load, multiply the provisional target velocity vector by a correction coefficient thereby setting a target velocity vector in a case where magnitude of the provisional target velocity vector is equal to or greater than an upper limit, the correction coefficient being set to be greater than zero and equal to or smaller than one, set the provisional target velocity vector to the target velocity vector in a case where the magnitude of the provisional target velocity vector is smaller than the upper limit, and control the drive unit based on the target velocity vector.

According to this aspect, in a case where the magnitude of the provisional target velocity vector is equal to or greater than the upper limit, the correction coefficient is set and the target velocity vector is limited. Accordingly, it is possible to provide a cart that can limit the velocity in response to an excessive operation.

In the above aspect, preferably, a value calculated by dividing the upper limit by the magnitude of the provisional target velocity vector is set to the correction coefficient.

According to this aspect, the target velocity vector is set to be equal to or smaller than the upper limit. Further, the direction of the target velocity vector becomes identical to the direction of the provisional target velocity vector, so that the travel direction of the cart can be maintained.

Thus, according to the above aspects, it is possible to provide a cart that can limit the velocity in response to an excessive operation.

DETAILED DESCRIPTION OF THE INVENTION

In the following, an embodiment of a cart according to the present invention will be described with reference to the drawings. Hereinafter, each direction is defined based on the cart.

Figure 1:
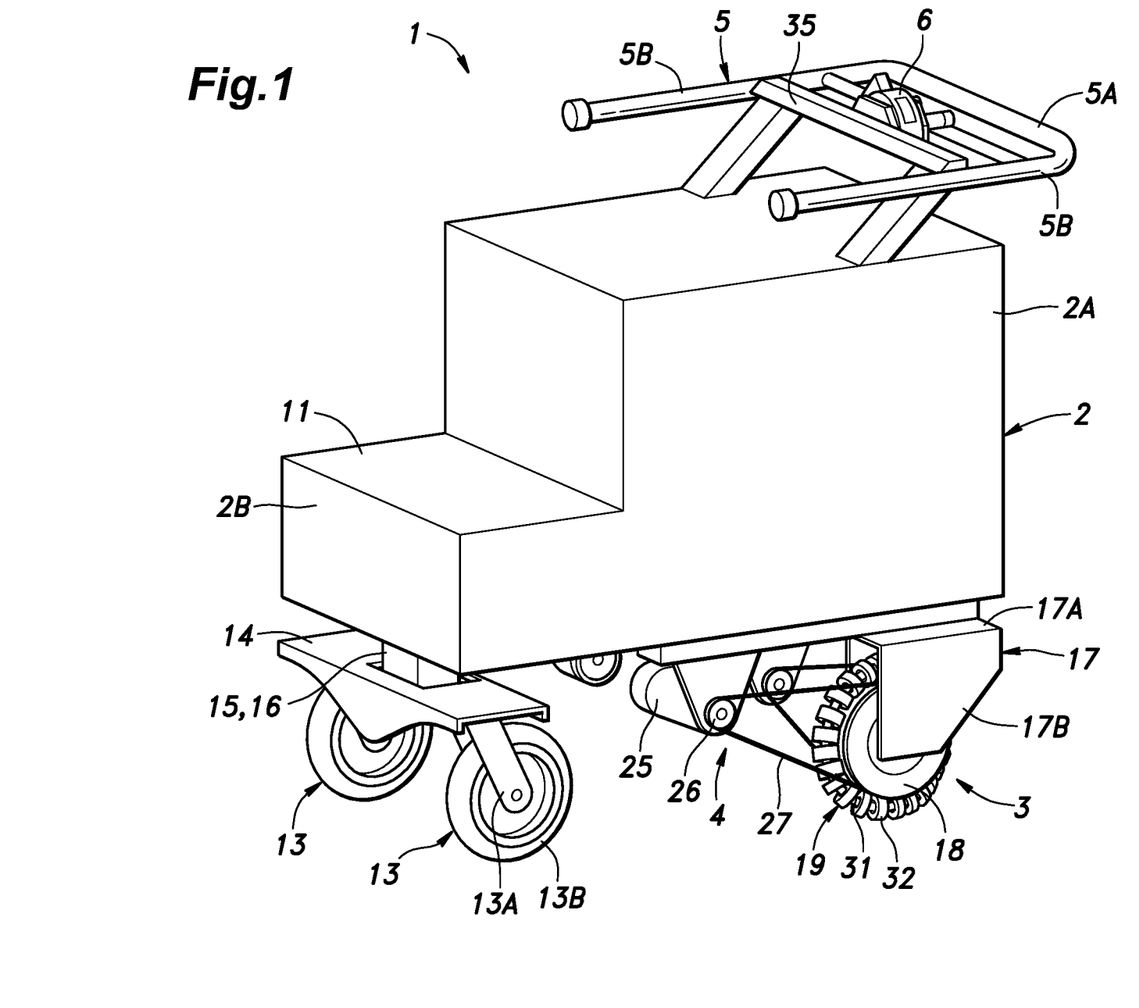
FIG. 1 is a perspective view of a cart according to an embodiment.

As shown in FIG. 1, a cart (vehicle) 1 includes a vehicle body 2, at least one omnidirectional wheel 3 provided at the vehicle body 2 and configured to move the vehicle body 2 in all directions along a floor, a drive unit 4 configured to drive each omnidirectional wheel 3, a handle 5 provided at the vehicle body 2 and configured to accept an operation by a user, a load sensor 6 configured to detect a load applied to the handle 5, and a control unit 7 configured to control the drive unit 4 based on the load detected by the load sensor 6.

The vehicle body 2 extends in the front and rear direction. A rear part 2A of the vehicle body 2 extends more upward than a front part 2B thereof. The front part 2B of the vehicle body 2 is provided with a support base 11 for supporting other devices. The devices supported by the support base 11 include, for example, inspection equipment such as an X-ray scanner. The devices may be fastened to the support base 11. The control unit 7, a battery, and various sensors may be provided inside the rear part 2A of the vehicle body 2.

In the present embodiment, a pair of omnidirectional wheels 3 are provided at a lower portion of the rear part 2A of the vehicle body 2. Further, left and right casters 13 are supported by a lower portion of the front part 2B of the vehicle body 2 via a suspension. The suspension includes an arm 14, a spring 15, and a shock absorber 16. The arm 14 is arranged below the vehicle body 2 and extends in the lateral direction. The spring 15 and the shock absorber 16 are arranged between the vehicle body 2 and the arm 14. Each caster 13 is arranged below lateral ends of the arm 14. Each caster 13 includes a fork 13A coupled to the arm 14 so as to rotate around an axis extending in the up-and-down direction, and a wheel 13B supported by the fork 13A so as to rotate around an axis extending in the horizontal direction. The fork 13A rotates freely with respect to the arm 14, and the wheel 13B rotates freely with respect to the fork 13A.

Figure 2:
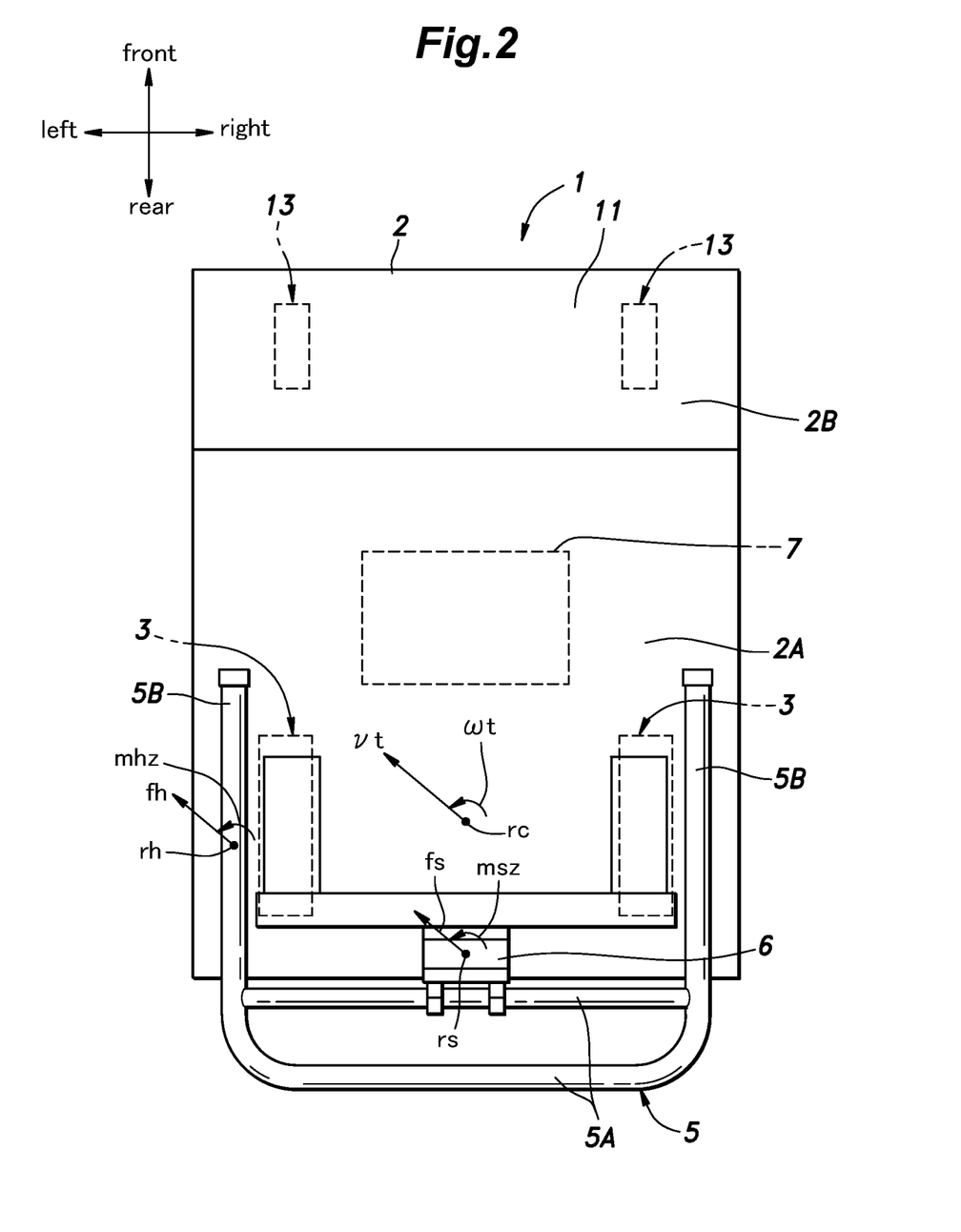
FIG. 2 is a plan view of the cart.
Figure 3:
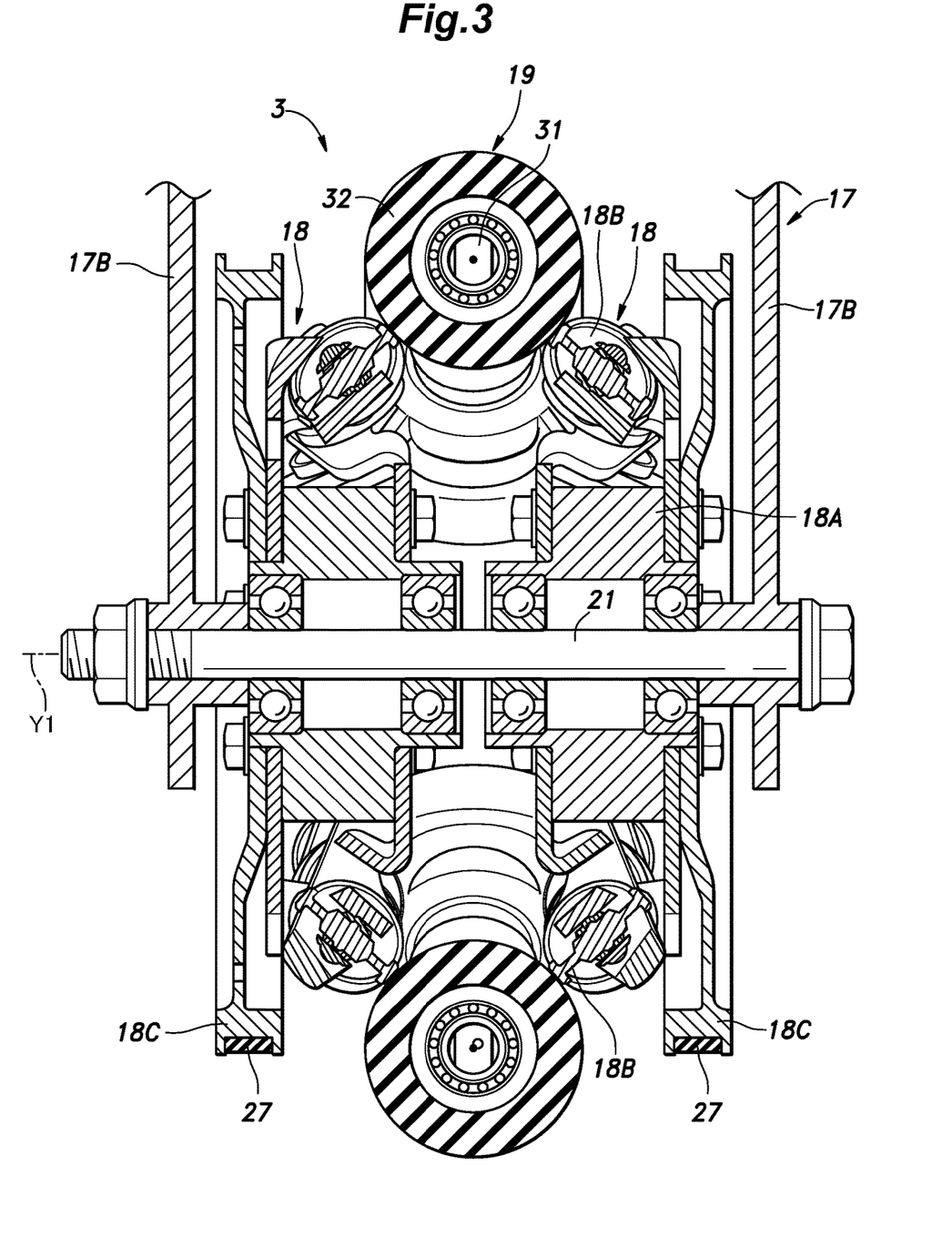
FIG. 3 is a cross-sectional view of an omnidirectional wheel.

As shown in FIG. 2, the pair of omnidirectional wheels 3 are arranged at an interval in the lateral direction. In the present embodiment, the pair of omnidirectional wheels 3 is arranged on a lower left side and a lower right side of the rear part 2A of the vehicle body 2. As shown in FIG. 3, each omnidirectional wheel 3 includes a frame 17, a pair of drive disks 18 rotatably supported by the frame 17, and an annular main wheel 19 arranged between the pair of drive disks 18.

As shown in FIGS. 1 and 3, the frame 17 includes an upper frame 17A coupled to a lower portion of the vehicle body 2, and a pair of side frames 17B extending downward from lateral ends of the upper frame 17A. Between lower ends of the pair of side frames 17B, a support shaft 21 extending in the lateral direction is provided. The pair of drive disks 18 are rotatably supported by the support shaft 21. The pair of drive disks 18 is configured to rotate around an axis Y1 of the support shaft 21. The lateral position of each drive disk 18 is regulated (fixed) with respect to the support shaft 21. Drive disks 18 face each other at an interval in the lateral direction.

The drive disks 18 are respectively arranged on both lateral sides of the annular main wheel 19, and configured to apply a frictional force to the main wheel 19 so as to rotate the main wheel 19 around a central axis and an annular axis. Each drive disk 18 includes a disk-shaped base 18A rotatably supported by the frame 17 and drive rollers 18B rotatably supported by an outer circumferential portion of the base 18A. The drive rollers 18B are inclined with respect to each other, and come into contact with the main wheel 19. The base 18A is arranged coaxially with the support shaft 21.

Each drive disk 18 has an opposite surface. The opposite surface of one drive disk 18 faces away from the opposite surface of the other drive disk 18. A driven pulley 18C is provided on the opposite surface of each drive disk 18. The driven pulley 18C is provided coaxially with the drive disk 18. The drive unit 4 is provided at a lower portion of the vehicle body 2. The drive unit 4 includes a plurality of electric motors 25 corresponding to the respective drive disks 18. In the present embodiment, four electric motors 25 are provided so as to correspond to the four drive disks 18. A drive pulley 26 is provided on an output shaft of each electric motor 25. The drive pulley 26 and the driven pulley 18C, which correspond to each other, are connected by a belt 27. As each electric motor 25 rotates independently of each other, each drive disk 18 rotates independently of each other.

Figure 4:
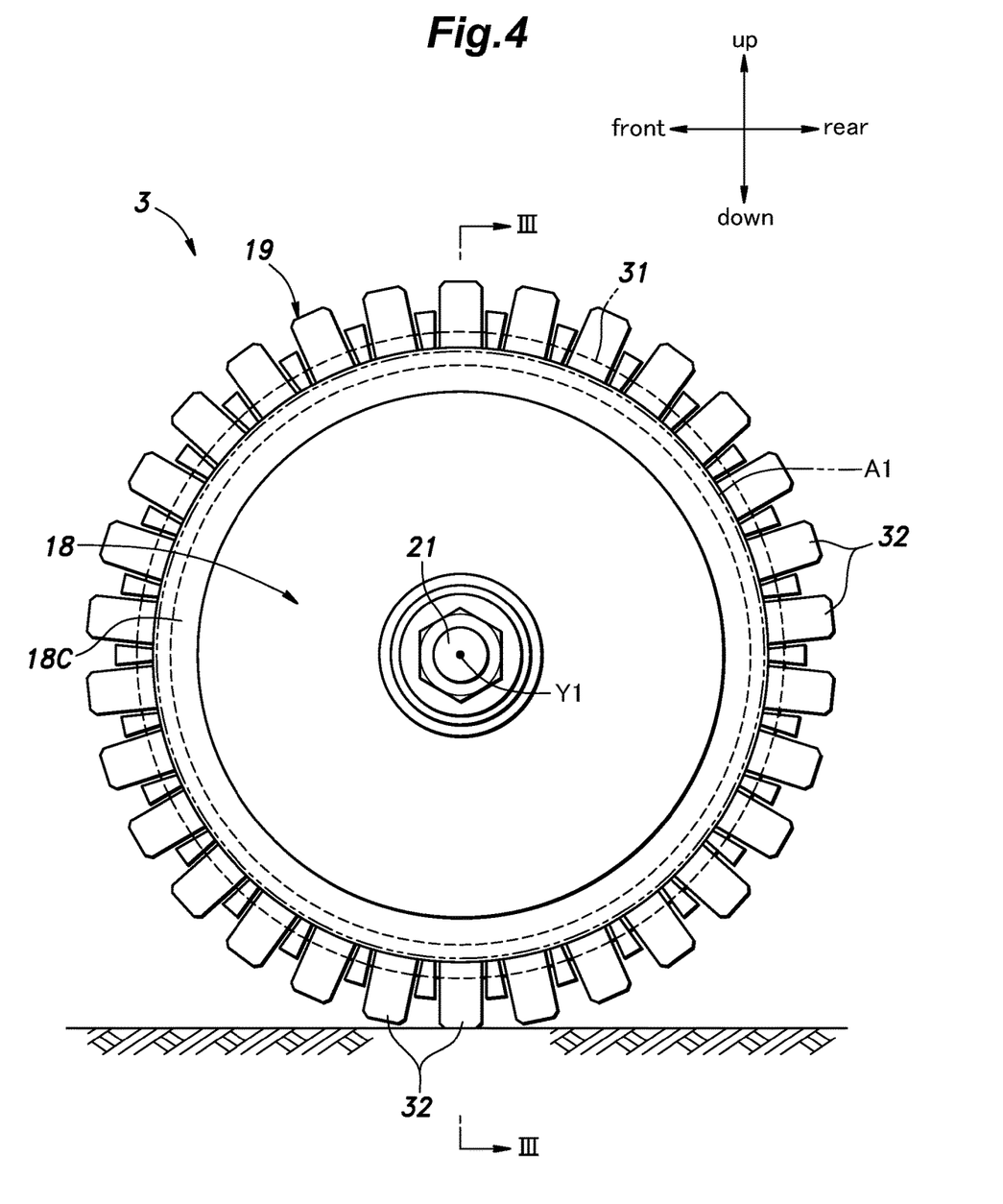
FIG. 4 is a side view of a main wheel.

As shown in FIG. 4, the main wheel 19 has an annular shape, and is arranged between the pair of drive disks 18 so as to be coaxial therewith. The main wheel 19 comes into contact with the drive rollers 18B, and can rotate around the central axis and the annular axis. The main wheel 19 includes an annular core member 31 and a plurality of driven rollers 32 rotatably supported by the core member 31. The plurality of driven rollers 32 is arranged at equal intervals in the circumferential direction of the core member 31. Each driven roller 32 is supported by the core member 31 so as to rotate around an axis A1 (annular axis) of the annular core member 31. More specifically, each driven roller 32 can rotate around the tangent of the core member 31 at the respective position with respect to the core member 31. Upon receiving an external force, each driven roller 32 rotates with respect to the core member 31.

The main wheel 19 is arranged along outer circumferential portions of the pair of drive disks 18, and comes into contact with the plurality of drive rollers 18B of each drive disk 18. The drive rollers 18B of each drive disk 18 come into contact with an inner circumferential portion of the main wheel 19, thereby holding the main wheel 19 from both lateral sides thereof. Further, the drive rollers 18B of the left and right drive disks 18 come into contact with the inner circumferential portion of the main wheel 19, thereby regulating (suppressing) the displacement of the drive disks 18 in the radial direction around the axis Y1. Accordingly, the main wheel 19 is supported by the left and right drive disks 18, and the central axis of the main wheel 19 (the core member 31) is arranged coaxially with the axis Y1 of the left and right drive disks 18. The plurality of driven rollers 32 of the main wheel 19 comes into contact with the plurality of drive rollers 18B of the left and right drive disks 18.

According to each omnidirectional wheel 3, in a case where the pair of drive disks 18 rotate in the same direction at the same rotational speed, the main wheel 19 rotates together with the pair of drive disks 18. That is, the main wheel 19 rotates forward or rearward around its own rotational axis which matches the axis Y1. At this time, the drive rollers 18B of the drive disks 18 and the driven rollers 32 of the main wheel 19 do not rotate with respect to the core member 31. According to each omnidirectional wheel 3, in a case where there is a difference in rotational speeds of the pair of drive disks 18, a component force is applied from the drive rollers 18B of the left and right drive disks 18 to the driven rollers 32 of the main wheel 19. The component force is a force in a direction perpendicular to a force in the circumferential direction (tangential direction) caused by the rotation of the pair of drive disks 18. Since the axis of each drive roller 18B is inclined with respect to the circumferential direction of the drive roller 18B (the drive disks 18), the component force is generated due to the difference in the rotational speeds of the pair of drive disks 18. Owing to this component force, the drive rollers 18B rotate with respect to the base 18A and the driven rollers 32 rotate with respect to the core member 31. Accordingly, the main wheel 19 generates a driving force in the lateral direction.

The cart 1 moves forward as the left and right omnidirectional wheels 3 rotate forward at the same speed. The cart 1 moves rearward as the left and right omnidirectional wheels 3 rotate rearward at the same speed. The cart 1 turns to the right or left as a speed difference is generated in the front-and-rear rotation of the left and right omnidirectional wheels 3. The cart 1 translates to the right or left as the driven rollers 32 of the main wheel 19 of the left and right omnidirectional wheels 3 rotate.

As shown in FIGS. 1 and 2, a handle holder 35 protruding upward is provided on an upper portion of the rear part 2A of the vehicle body 2. The handle 5 is supported by the handle holder 35 via the load sensor 6. The load sensor 6 may consist of a three-axis load sensor configured to detect loads along two axes that are perpendicular to each other on a horizontal plane and a moment around the vertical axis (z-axis). In the present embodiment, the load sensor 6 is configured to detect a front and rear load, a lateral load, and the moment around the vertical axis applied to the handle 5. The front and rear load is a load in the front-and-rear direction (x-axis direction). The lateral load is a load in the lateral direction (y-axis direction). The load sensor 6 includes a main body portion and an input portion provided in the main body portion. The main body portion is coupled to the handle holder 35.

The handle 5 includes a lateral portion 5A extending in the lateral direction and a pair of front and rear portions 5B extending forward from lateral ends of the lateral portion 5A. The laterally central portion of the lateral portion 5A is coupled to the input portion of the load sensor 6.

As shown in FIG. 2, when the user applies an external force fh and a moment mhz to a position rh of the handle 5, the load sensor 6 detects a detected force fs (detected load) and a detected moment msz at a sensor position rs. The detected force fs includes a front and rear load fs1 as a component in the front-and-rear direction and a lateral load fs2 as a component in the lateral direction.

The control unit 7 consists of an electronic control unit (ECU) that includes a processor such as a CPU, a nonvolatile memory such as a ROM, a volatile memory such as a RAM, and the like. The processor executes operation processing according to a program stored in the nonvolatile memory so that the control unit 7 controls the drive unit 4. The control unit 7 may consist of one piece of hardware, or may consist of a unit including multiple pieces of hardware. Further, the functions of the control unit 7 may be at least partially executed by hardware such as an LSI, an ASIC, and an FPGA, or may be executed by a combination of software and hardware.

Figure 5:
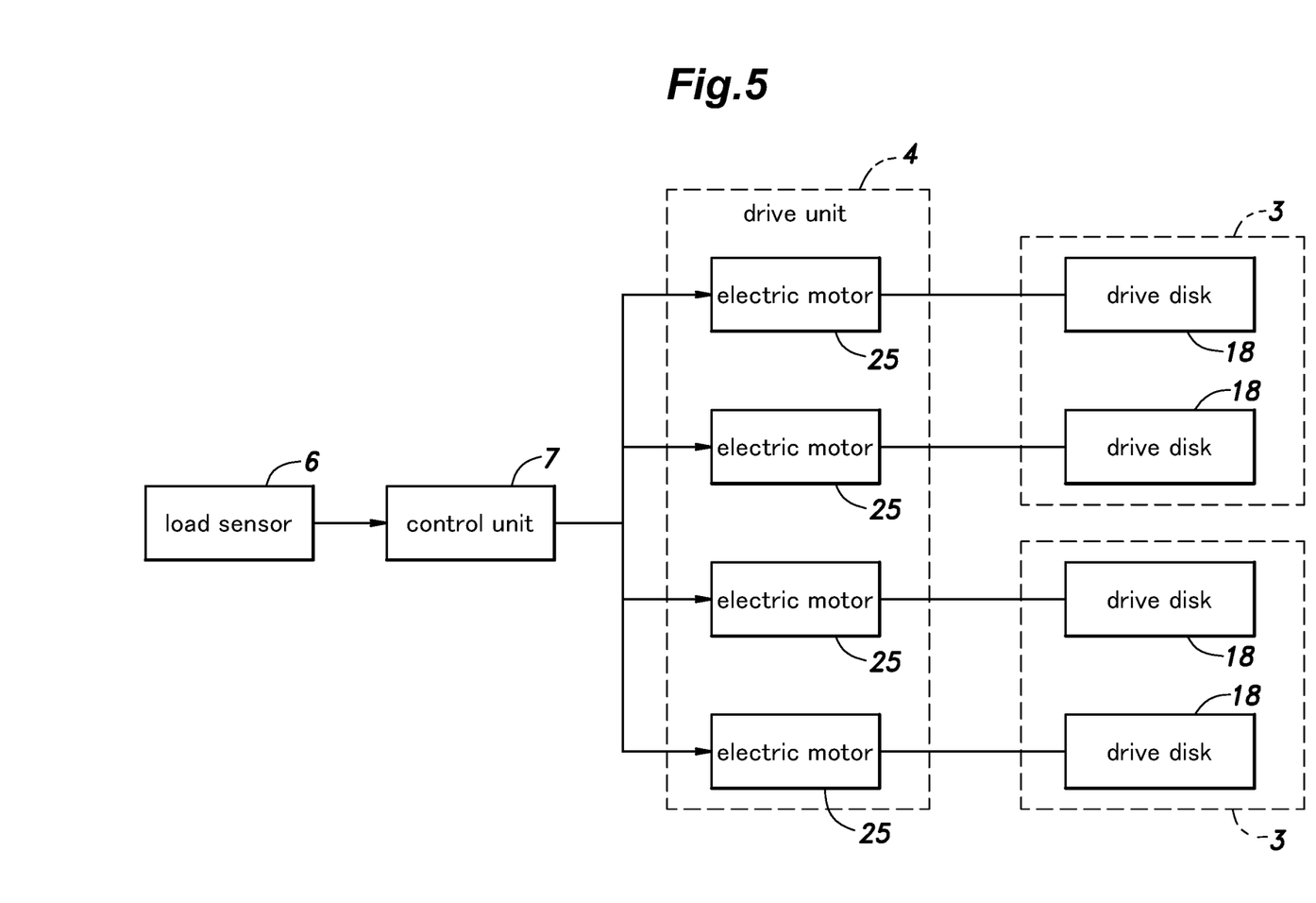
FIG. 5 is a block diagram showing a control unit of the cart.

As shown in FIG. 5, the control unit 7 is connected to the load sensor 6 and the drive unit 4. The load sensor 6 outputs a detection signal to the control unit 7. The control unit 7 outputs a control signal to the drive unit 4.

The control unit 7 controls the drive unit 4 based on the detection signal from the load sensor 6. The load sensor 6 is interposed between the vehicle body 2 and the handle 5. The load sensor 6 detects the magnitude and direction of the operation force (load) the user applies to the handle 5. The control unit 7 may determine a target front and rear velocity vt1, a target lateral velocity vt2, and a target angular velocity ωt of the cart 1 based on the detection signal from the load sensor 6, and determine the control amount of each electric motor 25 of the drive unit 4 based on the target front and rear velocity vt1, the target lateral velocity vt2, and the target angular velocity ωt.

Figure 6:
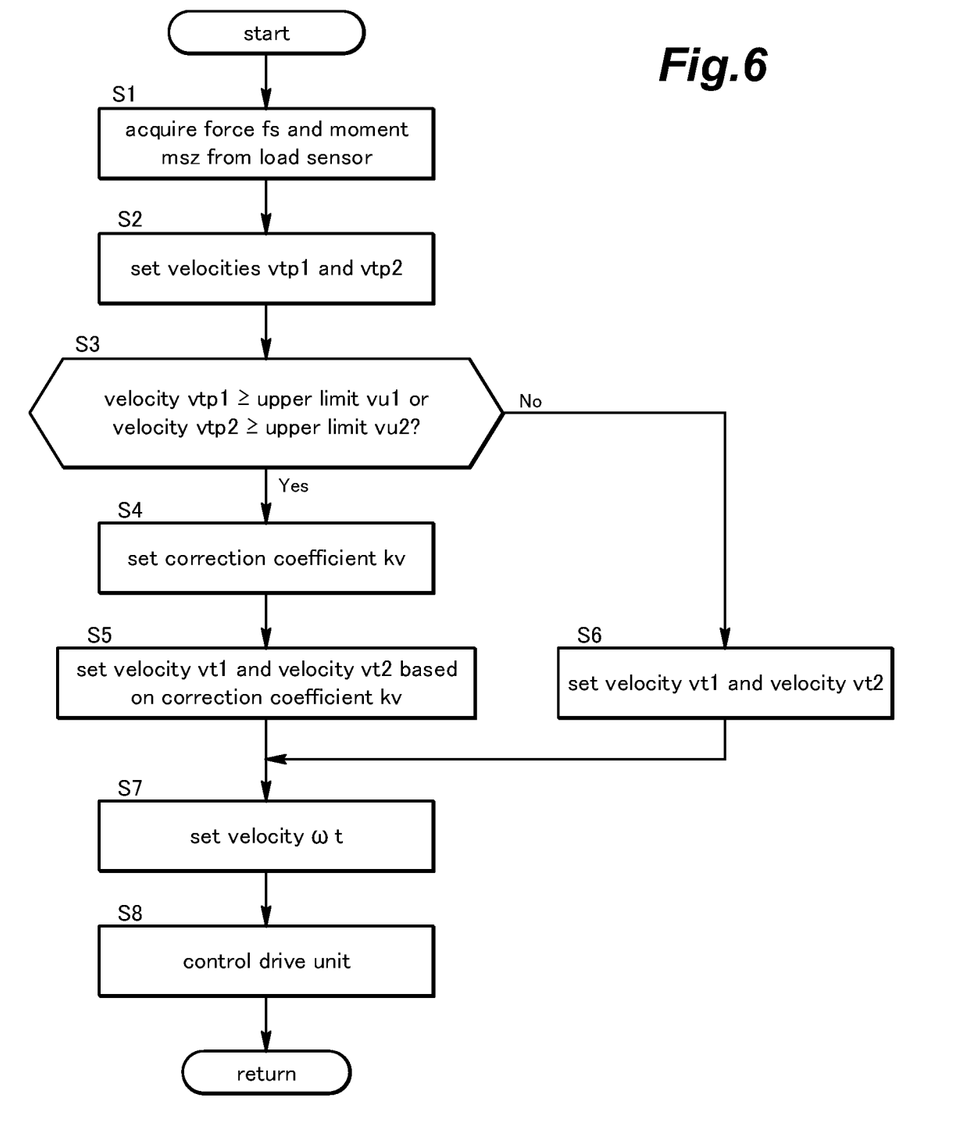
FIG. 6 is a flowchart showing a control procedure executed by the control unit.

The control unit 7 controls the drive unit 4 based on a flowchart shown in FIG. 6. First, the control unit 7 acquires the detected force fs (detected load) and the detected moment msz detected by the load sensor 6 based on the detection signal from the load sensor 6 (S1). The detected force fs includes the front and rear load fs1 and the lateral load fs2.

Next, the control unit 7 sets a provisional target front and rear velocity vtp1 of the vehicle body 2 based on the front and rear load fs1, and sets a provisional target lateral velocity vtp2 of the vehicle body 2 based on the lateral load fs2 (S2). The provisional target front and rear velocity vtp1 may be set, for example, by multiplying the front and rear load fs1 by a prescribed coefficient K1. Further, the provisional target lateral velocity vtp2 may be set, for example, by multiplying the lateral load fs2 by a prescribed coefficient K2. The setting methods of the provisional target front and rear velocity vtp1 and the provisional target lateral velocity vtp2 are not limited to these.

Next, the control unit 7 determines whether the provisional target front and rear velocity vtp1 is equal to or higher than a front and rear velocity upper limit vu1 or whether the provisional target lateral velocity vtp2 is equal to or higher than a lateral velocity upper limit vu2 (S3). The front and rear velocity upper limit vu1 and the lateral velocity upper limit vu2 are preset values.

In a case where the provisional target front and rear velocity vtp1 is equal to or higher than the front and rear velocity upper limit vu1 or the provisional target lateral velocity vtp2 is equal to or higher than the lateral velocity upper limit vu2 (the determination result of S3 is Yes), the control unit 7 sets a correction coefficient kv for reducing the target velocities (S4). The correction coefficient kv is set to be greater than zero and equal to or smaller than one. The correction coefficient kv may be a preset value. Alternatively, the smaller of a first value and a second value may be set to the correction coefficient kv. The first value is calculated by dividing the front and rear velocity upper limit vu1 by the provisional target front and rear velocity vtp1. The second value is calculated by dividing the lateral velocity upper limit vu2 by the provisional target lateral velocity vtp2.

Next to step S4, the control unit 7 sets the target front and rear velocity vt1 by multiplying the provisional target front and rear velocity vtp1 by the correction coefficient kv, and sets the target lateral velocity vt2 by multiplying the provisional target lateral velocity vtp2 by the correction coefficient kv (S5).

In a case where the provisional target front and rear velocity vtp1 is lower than the front and rear velocity upper limit vu1 and the provisional target lateral velocity vtp2 is lower than the lateral velocity upper limit vu2 (determination result of S3 is No), the control unit 7 sets the provisional target front and rear velocity vtp1 to the target front and rear velocity vt1, and sets the provisional target lateral velocity vtp2 to the target lateral velocity vt2 (S6).

After setting the target front and rear velocity vt1 and the target lateral velocity vt2 in step S5 or step S6, the control unit 7 sets the target angular velocity ωt of the cart 1 based on the detected moment msz and the detected force fs (S7). For example, the target angular velocity ωt may be set by multiplying a prescribed value by a prescribed coefficient k3. The prescribed value is acquired by adding the detected moment msz to the outer product of the relative position rs (sensor position) of the load sensor 6 with respect to a reference point rc and the detected force fs (((rs−rc)×fs)+msz). The target angular velocity ωt is set around the reference point rc. The reference point rc may be set at a position that matches the center of gravity of the cart 1 in a plan view. Further, the reference point rc is set closer to the handle 5, so that the couple required for the lateral movement operation is reduced, and thus the lateral movement operation can be performed with a small force. In the present embodiment, the reference point rc is arranged at a midpoint of a line segment connecting the pair of omnidirectional wheels 3. The process of step S7 may be performed after step S1 or S2.

The control unit 7 controls the drive unit 4 (S8) based on the target front and rear velocity vt1, the target lateral velocity vt2, and the target angular velocity ωt. The control unit 7 sets a target rotational speed rt of each electric motor 25 based on the target front and rear velocity vt1, the target lateral velocity vt2, and the target angular velocity ωt. Then, the control unit 7 may control the current supplied to each electric motor 25 such that the rotational speed of each electric motor 25 becomes the target rotational speed.

In the following, an example of the way how the control unit 7 controls the drive unit 4 will be described. First, the control unit 7 refers to a first map, and thus sets a first rotational speed r1 of each electric motor 25 based on the target front and rear velocity vt1. The first map defines the relationship between the target front and rear velocity vt1 and the rotational speed of each electric motor 25. Next, the control unit 7 refers to a second map, and thus sets a second rotational speed r2 of each electric motor 25 based on the target lateral velocity vt2. The second map defines the relationship between the target lateral velocity vt2 and the rotational speed of each electric motor 25. Next, the control unit 7 refers to a third map, and thus sets a third rotational speed r3 of each electric motor 25 based on the target angular velocity ωt. The third map defines the relationship between the target angular velocity ωt and the rotational speed of each electric motor 25. Next, the control unit 7 adds the first rotational speed r1, the second rotational speed r2, and the third rotational speed r3 of each electric motor 25, and thus calculates the provisional target rotational speed rtp of each electric motor 25 (rtp=r1+r2+r3). In a case where the provisional target rotational speed rtp of at least one electric motor 25 is higher than a maximum rotational speed rm, that is, in a case where at least one provisional target rotational speed rtp is higher than the maximum rotational speed rm, the control unit 7 multiplies a motor rotational speed correction coefficient kr by the first rotational speed r1 and the second rotational speed r2, and thus calculates the target rotational speed rt (rt=kr×r1+kr×r2+r3). The motor rotational speed correction coefficient kr is set to greater than zero and equal to or smaller than one. The maximum rotational speed rm may be a preset value. The motor rotational speed correction coefficient kr is determined based on the maximum rotational speed rm, the first rotational speed r1, the second rotational speed r2, and the third rotational speed r3. The motor rotational speed correction coefficient kr may be set based on, for example, the following equation 1.

$$kr=(rm-|r3|)/(|r1|+|r2|) \quad \text{[equation 1]}$$

According to equation 1, when the provisional target rotational speed rtp is higher than the maximum rotational speed rm, the target rotational speed rt is set to the maximum rotational speed rm. Further, the motor rotational speed correction coefficient kr may be a preset value. In a case where the provisional target rotational speed rtp of no electric motor 25 is higher than the maximum rotational speed rm, that is, in a case where all the provisional target rotational speeds rtp are equal to or lower than the maximum rotational speed rm, the control unit 7 sets the provisional target rotational speed rtp to the target rotational speed rt. Then, the control unit 7 refers to a fourth map, and thus sets a current value It supplied to each electric motor 25 based on the target rotational speed rt of each electric motor 25. The fourth map defines the relationship between the target rotational speed rt and the current value It supplied to each electric motor 25.

According to the above embodiment, in a case where the provisional target front and rear velocity vtp1 is equal to or higher than the front and rear velocity upper limit vu1 or the provisional target lateral velocity vtp2 is equal to or higher than the lateral velocity upper limit vu2, the correction coefficient kv is set and thus the target front and rear velocity vt1 and the target lateral velocity vt2 are limited. Accordingly, it is possible to provide a cart 1 that can limit the velocity in response to an excessive operation.

Figure 7:
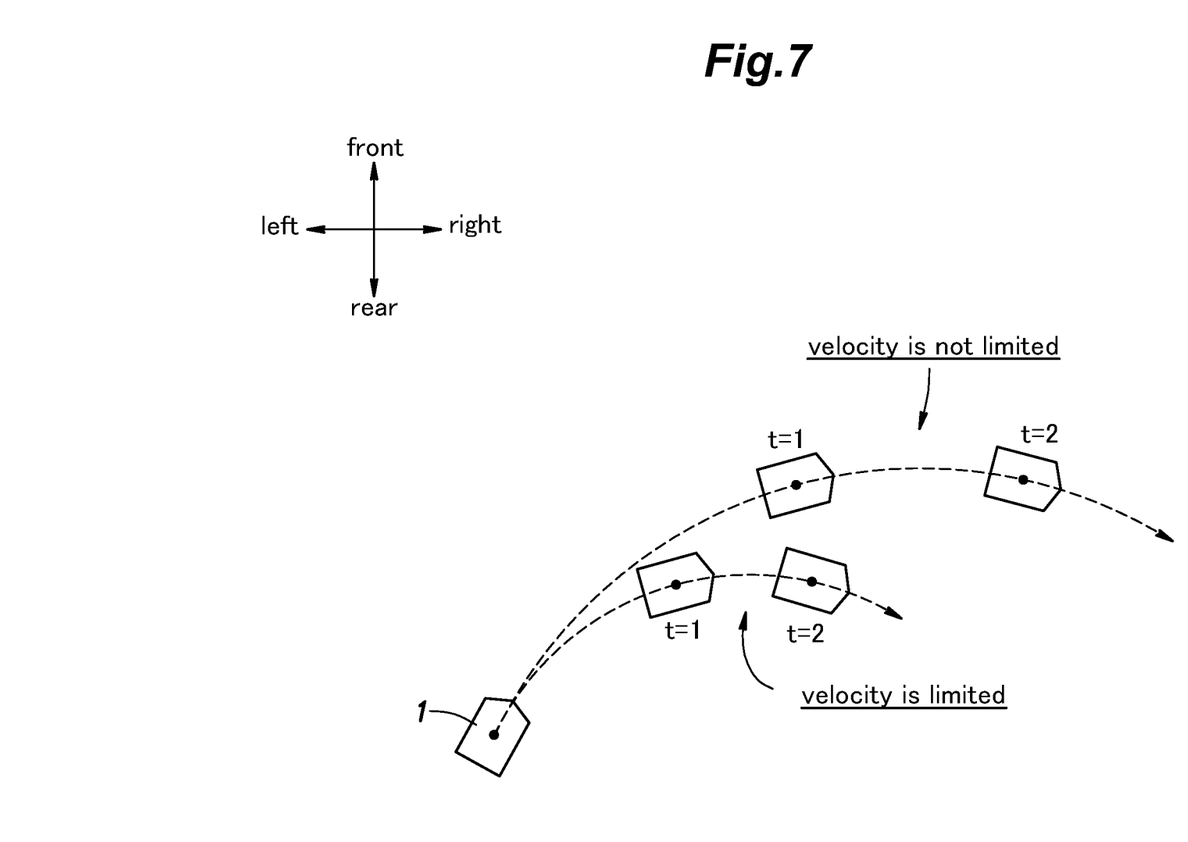
FIG. 7 is a plan view showing the direction of the cart.

Further, the provisional target front and rear velocity vtp1 and the provisional target lateral velocity vtp2 are corrected by the common correction coefficient kv, and thus the ratio of the target front and rear velocity vt1 to the target lateral velocity vt2 becomes identical to the ratio of the provisional target front and rear velocity vtp1 to the provisional target lateral velocity vtp2. Further, even if the provisional target rotational speed rtp of at least one electric motor 25 is higher than the maximum rotational speed rm, each provisional target rotational speed rtp of the electric motor 25 is corrected to a value equal to or smaller than the maximum rotational speed rm such that the ratio of the target front and rear velocity vt1 and the target lateral velocity vt2 and the target angular velocity ωt do not change. Accordingly, the travel direction of the cart 1 is maintained even when the velocity thereof is limited. Further, the target angular velocity ωt is not limited regardless of the operation force of the user. Thus, it is possible to turn the cart 1 according to the intention of the user. Accordingly, as shown in FIG. 7, the direction of the cart 1 at each time in a case where the velocity of the cart 1 is limited becomes equal to the direction of the cart 1 at each time in a case where the velocity of the cart 1 is not limited.

The reference point rc of the target angular velocity ωt is arranged at a midpoint of the pair of omnidirectional wheels 3. Accordingly, it is possible to turn the cart 1 efficiently.

Concrete embodiments of the present invention have been described in the foregoing, but the present invention should not be limited by the foregoing embodiments and various modifications and alterations are possible within the scope of the present invention. For example, the control unit 7 may set a provisional target velocity vector vtp of the vehicle body 2 based on the load detected by the load sensor 6. The control unit 7 may multiply the provisional target velocity vector vtp by a correction coefficient kv set to be greater than zero and equal to or smaller than one, and thus set a target velocity vector vt in a case where the magnitude of the provisional target velocity vector vtp is equal to or greater than the upper limit vu. The provisional target velocity vector vtp may be set based on the provisional target front and rear velocity vtp1 and the provisional target lateral velocity vtp2. The value acquired by dividing the upper limit vu by the magnitude of the provisional target velocity vector vtp may be set to the correction coefficient kv.

The invention claimed is:
1. A cart, comprising:
a vehicle body;
at least one omnidirectional wheel provided at the vehicle body and configured to move the vehicle body in all directions along a floor;
a drive unit configured to drive each omnidirectional wheel;
a handle provided at the vehicle body and configured to accept an operation by a user;
a load sensor configured to detect a front and rear load and a lateral load applied to the handle; and
a control unit configured to control the drive unit based on the front and rear load and the lateral load detected by the load sensor,
wherein the control unit is configured to
set a provisional target front and rear velocity of the vehicle body based on the front and rear load, and set a provisional target lateral velocity of the vehicle body based on the lateral load,
multiply the provisional target front and rear velocity by a correction coefficient thereby setting a target front and rear velocity, and multiply the provisional target lateral velocity by the correction coefficient thereby setting a target lateral velocity in a case where the provisional target front and rear velocity is equal to or higher than a front and rear velocity upper limit or in a case where the provisional target lateral velocity is equal to or higher than a lateral velocity upper limit, the correction coefficient being set to be greater than zero and equal to or smaller than one,
set the provisional target front and rear velocity to the target front and rear velocity, and set the provisional target lateral velocity to the target lateral velocity in a case where the provisional target front and rear velocity is lower than the front and rear velocity upper limit and the provisional target lateral velocity is lower than the lateral velocity upper limit, and
control the drive unit based on the target front and rear velocity and the target lateral velocity.

2. The cart according to claim 1, wherein the smaller of a first value and a second value is set to the correction coefficient, the first value being calculated by dividing the front and rear velocity upper limit by the provisional target front and rear velocity, the second value being calculated by dividing the lateral velocity upper limit by the provisional target lateral velocity.

3. The cart according to claim 1, wherein the at least one omnidirectional wheel comprises a pair of omnidirectional wheels arranged at an interval in a lateral direction,
the load sensor is configured to detect a moment around a vertical axis in addition to the front and rear load and the lateral load, and
the control unit is configured to
set a target angular velocity of the vehicle body based on the moment, and
control the drive unit based on the target front and rear velocity, the target lateral velocity, and the target angular velocity.

4. The cart according to claim 3, wherein the control unit sets the target angular velocity independently of the correction coefficient.

5. The cart according to claim 4, wherein the drive unit includes a plurality of electric motors, and
the control unit is configured to
set a first rotational speed of each electric motor based on the target front and rear velocity, set a second rotational speed of each electric motor based on the target lateral velocity, set a third rotational speed of each electric motor based on the target angular velocity, and set a provisional target rotational speed of each electric motor based on the first rotational speed, the second rotational speed, and the third rotational speed,
set a target rotational speed of each electric motor based on a product of a motor rotational speed correction coefficient and the first rotational speed, a product of the motor rotational speed correction coefficient and the second rotational speed, and the third rotational speed in a case where the provisional target rotational speed of at least one of the electric motors is higher than a maximum rotational speed, the motor rotational speed correction coefficient being set to be greater than zero and equal to or smaller than one, and
set the provisional target rotational speed to the target rotational speed in a case where the provisional target rotational speed of all the electric motors is equal to or lower than the maximum rotational speed.

6. The cart according to claim 5, wherein the motor rotational speed correction coefficient is set based on a following equation (1) in which "kr" represents the motor rotational speed correction coefficient, "rm" represents the maximum rotational speed, "r1" represents the first rotational speed, "r2" represents the second rotational speed, and "r3" represents the third rotational speed $$kr=(rm-|r3|)/(|r1|+|r2|) \quad \text{[equation 1]}.$$

7. The cart according to claim 5, wherein a reference point of the target angular velocity is arranged at a midpoint of a line segment connecting the pair of omnidirectional wheels.

8. The cart according to claim 7, wherein each omnidirectional wheel includes:
a pair of drive disks rotatably supported by the vehicle body and arranged coaxially so as to face each other;
a plurality of drive rollers arranged on an outer circumferential portion of each drive disk at intervals in a circumferential direction, each drive roller being supported so as to rotate around an axis inclining to the circumferential direction of the drive disk; and
a main wheel formed in an annular shape, arranged between the pair of drive disks, being in contact with the drive rollers, and configured to rotate around a central axis and an annular axis,
the plurality of electric motors comprises four electric motors corresponding to the respective drive disks and configured to rotate the corresponding drive disks, and
the control unit is configured to set the target rotational speed of each electric motor based on the target front and rear velocity, the target lateral velocity, and the target angular velocity.

9. A cart, comprising:
a vehicle body;
at least one omnidirectional wheel provided at the vehicle body and configured to move the vehicle body in all directions along a floor;
a drive unit configured to drive each omnidirectional wheel;
a handle provided at the vehicle body and configured to accept an operation by a user;
a load sensor configured to detect a load applied to the handle; and
a control unit configured to control the drive unit based on the load detected by the load sensor,
wherein the control unit is configured to
set a provisional target velocity vector of the vehicle body based on the load,
multiply the provisional target velocity vector by a correction coefficient thereby setting a target velocity vector in a case where magnitude of the provisional target velocity vector is equal to or greater than an upper limit, the correction coefficient being set to be greater than zero and equal to or smaller than one,
set the provisional target velocity vector to the target velocity vector in a case where the magnitude of the provisional target velocity vector is smaller than the upper limit, and
control the drive unit based on the target velocity vector.

10. The cart according to claim 9, wherein a value calculated by dividing the upper limit by the magnitude of the provisional target velocity vector is set to the correction coefficient.

* * * * *